United States Patent [19]

Hornung et al.

[11] Patent Number: 4,810,558

[45] Date of Patent: Mar. 7, 1989

[54] THREE DIMENSIONAL PATTERNING PROCESS

[75] Inventors: Mark A. Hornung, Inman; Charles E. Warner, Spartanburg, both of S.C.

[73] Assignee: Milliken Research Corporation, Spartanburg, S.C.

[21] Appl. No.: 171,044

[22] Filed: Mar. 21, 1988

[51] Int. Cl.[4] .............................................. B32B 3/26
[52] U.S. Cl. ................................... 428/159; 156/219; 156/220; 428/160; 428/246
[58] Field of Search ................. 156/219, 220; 428/158, 428/159, 160, 246

[56] References Cited

U.S. PATENT DOCUMENTS

| | | |
|---|---|---|
| 2,693,221 | 11/1954 | Lyijynen .......................... 428/159 |
| 3,196,030 | 7/1965 | Petry .............................. 156/78 |
| 3,196,062 | 7/1965 | Kristal ............................ 428/159 |
| 3,256,131 | 6/1966 | Koch et al. .................... 428/160 |
| 3,629,034 | 12/1971 | Kuroda ........................... 156/219 |
| 3,741,851 | 6/1973 | Erb et al. ....................... 428/161 |
| 3,887,678 | 6/1975 | Lewicki, Jr. .................... 428/159 |

Primary Examiner—William J. Van Balen
Attorney, Agent, or Firm—Earle R. Marden; H. William Petry

[57] ABSTRACT

A process to provide a patterned, laminated fabric in which an inner foam layer is embossed to hold the pattern in the outer decorative layer in position. The process continuously cold embosses the flame laminated fabric to allow continuous formation of the subject fabric at an acceptable rate of speed.

16 Claims, 1 Drawing Sheet

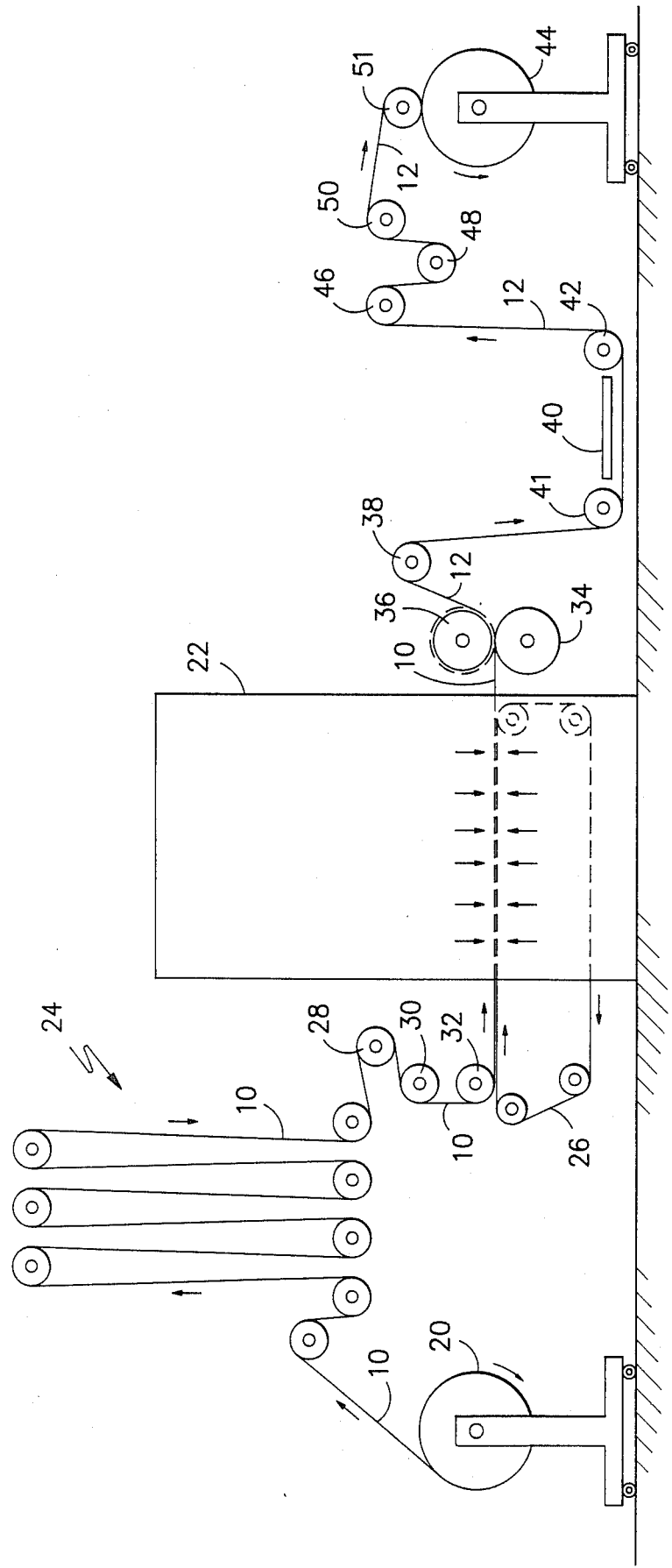
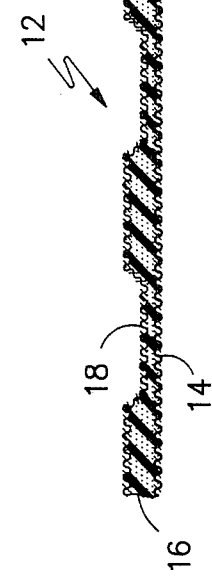
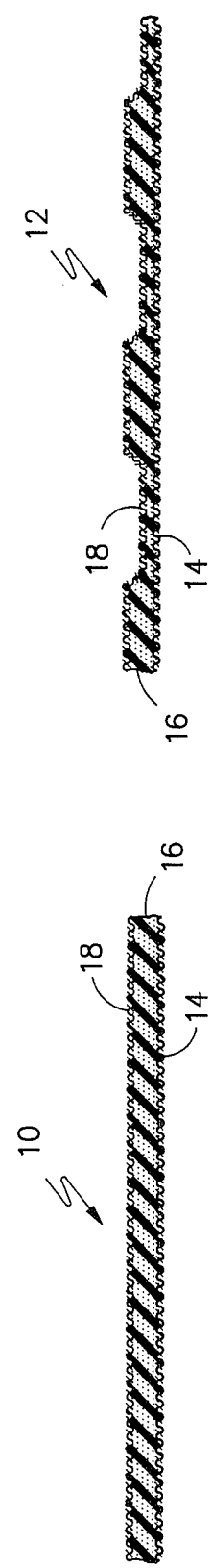
FIG. -1-
FIG. -3-
FIG. -2-

THREE DIMENSIONAL PATTERNING PROCESS

This invention relates generally to process to continuously emboss a laminated fabric to produce a patterned fabric which can be employed to upholster furniture, cover wall panels, etc.

An object of the invention is to continuously cold emboss a running web of laminated fabric without intermittent operation of the process.

Other objects and advantages of the invention will become clearly apparent as the specification proceeds to describe the invention with reference to the accompanying drawing in which:

FIG. 1 is a schematic representation of the new and improved embossing process;

FIG. 2 is a cross-sectional view of the laminated fabric to be embossed, and

FIG. 3 is a cross-sectional view of the fabric after being embossed.

In the preferred form of the invention the embossed fabric 12 produced is to be used to cover wall panels but obviously such use is only preferred and other uses can be made of the fabric. The starting fabric 10, as well as the embossed, patterned fabric 12, is a flame laminated composite of a woven polyester scrim fabric 14, a flexible polyurethane foam 16 and a woven, decorative polyester fabric 18.

The support or semi-rigid scrim fabric 14 is a light weight fabric of about 1.5 oz./sq.yd. of open construction with 25 warp ends/inch and 14 fill ends/inch woven in a 66 inch width. The foam fabric 16 is a commercially available foam type FT1730 made by Reeves Brothers and is approximately 68 inches wide with a density of 1.7 lb./cu.ft. and a thickness of 3/16th of an inch. The face or decorative fabric is a 66 inch wide woven fabric having a weight of 5.6 oz./sq.yd. woven with 94 warp ends/inch and 65 picks or fill ends/inch.

Looking now to FIG. 1 the embossing process will be explained. The fabric 10 to be embossed is supplied continuously from the supply roll 20 to the heating oven 22 through the conventional accumulator section 24 onto the endless conveyor 26 with the decorative fabric 18 facing upward by the rolls 28, 30 and 32. Preferably, the heating oven 22 is heated by hot dry air to a temperature in the range of 340°-360° F. to cause the surfaces of the foam layer 16 to become tacky. The hot composite fabric 10 is then passed between the nip of cooled smooth backup roll 34 and a cold engraved roll 36, both maintained at a temperature between 68°-70° F., to be compressed and cooled therebetween at a pressure of about 85-200 lbs. per linear inch to compress portions of the tacky polyurethane foam and the decorative fabric 18 laminated thereto to form a pattern on the face of the fabric 12 as shown in FIG. 3 and to cool the foam material below the tackifying temperature.

From the rolls 34, 36 the fabric 12 passes over the roll 38 and is guided therefrom under the inspection platform 40 by the rolls 41 and 42. From the roll 42, the fabric 12 is guided onto the center drive take-up roll 44, by a series of rolls 46, 48, 50 and 51. It should be noted that the roll 38 is mounted above the engraved roll 36 to provide more wrap-around of the engraved roll 36 than if it came straight out of the nip to provide additional cooling of the embossed fabric since the engraved roll is maintained at temperature of about 68°-70° F. This additional wrap with increased cooling capacity allows the speed of the continuous embossing process to be increased.

It can thereby be seen that an embossed patterned laminate fabric is continuously provided by embossing the softened inner layer of polyurethane foam, which holds the outer decorative fabric into patterned position since the outer decorative layer is laminated to the foam layer and deformed as the urethane layer is being embossed.

Although the preferred embodiment of the invention has been described, it is contemplated that changes may be made without departing from the scope or spirit of the invention and it is desired that the invention be limited only by the scope of the claims.

We claim:

1. A continuous process for making a patterned composite fabric from a laminated fabric having a scrim fabric on one side and a decorative fabric on the other side thereof separated therefrom by a layer of flexible foam material comprising the steps of : continuously supplying the laminated fabric into a heated oven to tackify the flexible foam material, continuously passing the laminated fabric between the nip of a cooled pattern roll and a back-up roll to simultaneously depress the decorative fabric into and emboss the flexible foam material and cool the laminate to provide a permanent pattern in the surface of the decorative fabric and continuously taking up the patterned fabric.

2. The process of claim 1 wherein the backup roll is cooled.

3. The process of claim 2 wherein the temperature of the cooled rolls is maintained in the range of 68°-70° F.

4. The process of claim 1 wherein said laminated fabric is directed upward as it exits from the nip of the cooled pattern roll and the back-up roll to cause the fabric to wrap partially around the cooled pattern roll to provide a longer period of cooling to the patterned fabric.

5. The process of claim 4 wherein the heated oven supplies dry heated air into contact with the laminated fabric.

6. The process of claim 5 wherein the heated oven is maintained at a temperature in the range of 340°-360° F.

7. The process of claim 6 wherein the cooled pattern roll is maintained at a temperature in the range of 68°-70° F.

8. The process of claim 4 wherein the cooled pattern roll is maintained at a temperature in the range of 68°-70° F.

9. The process of claim 8 wherein the backup roll is cooled.

10. The process of claim 9 wherein the temperature of the cooled backup roll is maintained in the range of 68°-70° F.

11. A patterned, laminated fabric for use as a wall panel fabric comprising: a scrim fabric, a flexible foam material laminated on one side to said scrim fabric and a decorative fabric laminated to the other side of the flexible foam material, said decorative fabric and said flexible foam material having identical patterns formed in the surface thereof.

12. The fabric of claim 11 wherein said scrim fabric and said decorative fabric are woven.

13. The fabric of claim 12 wherein said scrim fabric and said decorative fabrics are composed of substantially all polyester yarn.

14. The fabric of claim 11 wherein said flexible foam material is urethane.

15. The fabric of claim 14 wherein said urethane is a polyurethane.

16. The fabric of claim 15 wherein said scrim fabric and said decorative fabric are woven.

* * * * *